Jan. 25, 1944.   A. I. ZIPPER   2,340,037
CAPSULE
Filed Sept. 8, 1941

ALFRED IRVING ZIPPER
INVENTOR

BY Harry Ernest Rubens

ATTORNEY

Patented Jan. 25, 1944

2,340,037

UNITED STATES PATENT OFFICE 2,340,037

CAPSULE

Alfred Irving Zipper, New York, N. Y.

Application September 8, 1941, Serial No. 410,153

1 Claim. (Cl. 167—83)

My invention relates to a capsule intended for internal use, wherein both a liquid and a powder may be separately contained.

Capsules for internal use are usually of a gelatinous composition and come in two types: one, with a semi-rigid body provided with a sliding cap used principally for powders, and the other, a soft, flexible type usually moulded about a small quantity of liquid.

It is the primary object of my invention to combine into a single capsule, powders and liquids which are separately contained.

Capsules ordinarily used for carrying powders are not sealed to prevent oxidation of the contents. Accordingly, a further object of my invention is to provide a capsule of the foregoing characteristics wherein the contents are effectively sealed from the atmosphere.

Another object is to provide a simple and inexpensive means whereby the liquid and the powders may be placed in separate containers and the two combined to form a single integral unit.

Still another object consists in utilizing the soft and flexible-walled type of liquid container as a stopper for an open semi-rigid capsule body whereby the two are combined into a single unit with the semi-rigid capsule body effectively sealed from the atmosphere.

I accomplish these and other objects and obtain new results as will be apparent from the device described in the following description, particularly pointed out in the attached claim, and illustrated in the accompanying drawing, in which:

Figure 1:
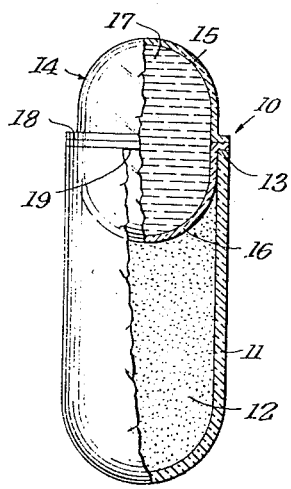
Fig. 1 is a partial sectional view of one form of my combined capsule.

Referring to the drawing and more particularly to Fig. 1, reference numeral 10 represents my novel capsule, comprising the semi-rigid body 11, in which the powder 12 is stored. The body is tubular in form, closed at one end, and open at the other, as at 13. At the open end 13, a soft gelatinous globule 14 is inserted, usually comprising two halves 15 and 16, moulded about the liquid contents 17.

The two halves 15 and 16 may be formed so as to provide a peripheral seam 18, enabling the shoulder portion 19 to be attached to the open end 13 of the capsule body 11, as by dipping the capsules into a liquid material from which capsule 14 is manufactured.

The lower half 16 of container 14 may be formed and attached to body 11 after filling the latter with powder, thereafter pressing the body 11 and the lower half portion 16 onto the formed upper half portion 15, and thereafter sealing the two halves while in the liquid, in a manner known to the art, or the container 14 may be formed and filled with the liquid contents 17, and shoulder 19 inserted around the mouth of the body 11, and attached thereto, as previously explained.

Figure 2:
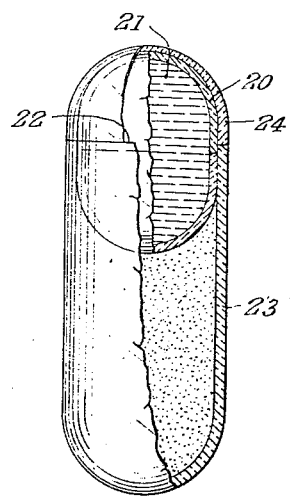
Fig. 2 is a partial sectional view of a modification.

In Fig. 2 the flexible container 20 containing the liquid 21 is provided with smooth seams, enabling the container 20 to be forced into the mouth 22 of body 23, which is provided with substantially the same diameter. The container 20, and body 23 are then dipped into a liquid solution of the gelatin, as aforesaid, and allowed to harden, forming the seal 24.

Figure 3:
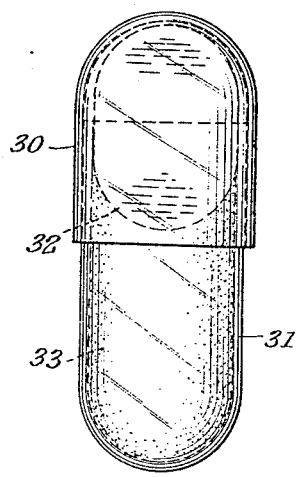
Fig. 3 is a side view of my capsule with a protecting cover.

In Fig. 3 a protecting semi-rigid cover 30, is inserted over the semi-rigid body 31, with the liquid filled container 32 positioned in the mouth of the body 31 and sealed therein, thus forming a completely enclosed semi-rigid outer covering with the internal container 32, acting as the sealing stopper for the powder contents 33 of body 31.

It will be understood that in using the word "powder," all solid substances are included thereby.

There are many advantages of my combined liquid and powder container, viz., I can combine two substances which are ordinarily not compatible or readily miscible, the sealed separation preventing physical and chemical contact of the contained substances. Further, I am able to prevent oxidation or contact with the atmosphere of the powder by utilizing the liquid container, which has a soft and flexible cover as a stopper which may be used to seal the powder contents in the capsule body, thus resulting in a saving of materials and manufacturing steps.

From the foregoing, it is apparent that I have provided a single capsule wherein two different types of ingredients, normally taken separately, may now be taken simultaneously as a single unit.

I have thus described my invention, but I desire it understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claim, and by means of which objects of my invention are attained and new results accomplished, as it is obvious that the particular embodiments herein shown and described are only some of the many that may be employed to attain these objects and accomplish these results.

I claim:

A capsule formed of two different gelatinous materials for internal use, comprising a semi-rigid tubular gelatinous container having one end thereof open and containing a powder therein, and a soft completely sealed flexible gelatinous covered globule of liquid consisting of two like sections sealed together at their meeting edges, and the globule containing the liquid, compressed and tightly positioned in the open mouth of the semi-rigid container and sealed therein, the liquid contents thereof being under sufficient pressure to cause the globule to act as a flexible stopper thereby sealing the contents of the container and causing the container and globule to form a unitary structure, for human internal use.

ALFRED IRVING ZIPPER.